United States Patent
Sweeney et al.

(10) Patent No.: US 10,247,363 B2
(45) Date of Patent: Apr. 2, 2019

(54) SMART PACKAGE

(71) Applicant: ENTEGRIS, INC., Billerica, MA (US)

(72) Inventors: Joseph D. Sweeney, New Milford, CT (US); Edward E. Jones, Woodbury, CT (US); Joseph R. Despres, Middletown, CT (US); Richard S. Ray, Phoenix, AZ (US); Peter C. Van Buskirk, Newtown, CT (US); Edward A. Sturm, New Milford, CT (US); Chris Scannell, Middlebury, CT (US)

(73) Assignee: Entegris, Inc., Billerica, MA (US)

( * ) Notice: Subject to any disclaimer, the term of this patent is extended or adjusted under 35 U.S.C. 154(b) by 0 days.

(21) Appl. No.: 15/549,875

(22) PCT Filed: Feb. 12, 2016

(86) PCT No.: PCT/US2016/017642
§ 371 (c)(1),
(2) Date: Aug. 9, 2017

(87) PCT Pub. No.: WO2016/130866
PCT Pub. Date: Aug. 18, 2016

(65) Prior Publication Data
US 2018/0023765 A1    Jan. 25, 2018

Related U.S. Application Data

(60) Provisional application No. 62/115,569, filed on Feb. 12, 2015.

(51) Int. Cl.
*G06K 19/06* (2006.01)
*F17C 13/02* (2006.01)
(Continued)

(52) U.S. Cl.
CPC ............ *F17C 13/026* (2013.01); *F17C 11/00* (2013.01); *F17C 13/003* (2013.01); *F17C 13/02* (2013.01);
(Continued)

(58) Field of Classification Search
CPC ........ F17C 13/06; F17C 11/00; F17C 13/003; F17C 2205/0038; F17C 2205/0391;
(Continued)

(56) References Cited

U.S. PATENT DOCUMENTS 6,089,027 A    7/2000  Wang et al.
6,302,139 B1   10/2001 Dietz
(Continued)

FOREIGN PATENT DOCUMENTS

EP    2 339 221 A2   6/2011
FR    2 942 540 A1   8/2010
(Continued)

*Primary Examiner* — Karl D Frech
(74) *Attorney, Agent, or Firm* — Entegris, Inc.

(57) ABSTRACT

A fluid supply package is described, which includes a fluid storage and dispensing vessel, and a fluid dispensing assembly coupled to the vessel and configured to enable discharge of fluid from the vessel under dispensing conditions, wherein the fluid supply package includes an informational augmentation device thereon, e.g., at least one of a quick read (QR) code and an RFID tag, for informational augmentation of the package. Process systems are described including process tools and one or more fluid supply packages of the foregoing type, wherein the process tool is configured for communicative interaction with the fluid supply package(s). Various communicative arrangements are described, which are usefully employed to enhance the efficiency and operation of process systems in which fluid supply packages of the foregoing type are employed.

19 Claims, 2 Drawing Sheets

(51) Int. Cl.
*F17C 11/00* (2006.01)
*F17C 13/00* (2006.01)
*G06K 19/07* (2006.01)

(52) U.S. Cl.
CPC ... *G06K 19/06037* (2013.01); *G06K 19/0723* (2013.01); *F17C 2205/0338* (2013.01); *F17C 2205/0391* (2013.01); *F17C 2205/05* (2013.01); *F17C 2205/054* (2013.01); *F17C 2205/058* (2013.01); *F17C 2250/0439* (2013.01); *F17C 2270/0518* (2013.01)

(58) Field of Classification Search
CPC ....... F17C 2205/058; F17C 2250/0439; G06K 19/06037; G06K 19/0723
USPC ................ 235/492, 491, 493, 383, 384, 385
See application file for complete search history.

(56) References Cited

U.S. PATENT DOCUMENTS

| | | | |
|---|---|---|---|
| 8,932,252 B2 * | 1/2015 | Edwards | G06Q 10/00 434/262 |
| 9,383,064 B2 | 7/2016 | Olander et al. | |
| 2008/0054000 A1 | 3/2008 | Goldman | |
| 2009/0140867 A1 | 6/2009 | Yin et al. | |
| 2010/0065146 A1 | 3/2010 | Plummer et al. | |
| 2010/0261430 A1 | 10/2010 | Parias | |
| 2012/0188076 A1 | 7/2012 | McSheffrey | |
| 2013/0101438 A1 | 4/2013 | Cedrone et al. | |
| 2013/0251913 A1 | 9/2013 | Olander et al. | |
| 2013/0334236 A1 | 12/2013 | Gerstel | |

FOREIGN PATENT DOCUMENTS

| | | |
|---|---|---|
| JP | 2003-524292 A | 8/2003 |
| JP | 2008173871 | 7/2008 |
| JP | 2009-008187 A | 1/2009 |
| JP | 2010-197117 A | 9/2010 |
| JP | 2013-517431 A | 5/2013 |
| JP | 2014-505322 A | 2/2014 |
| JP | 2014-212348 A | 11/2014 |
| KR | 2002-0026540 | 4/2002 |
| KR | 2008-0039373 | 5/2008 |
| WO | 01/83082 A1 | 11/2001 |
| WO | 01/83084 A1 | 11/2001 |
| WO | 02/095519 A1 | 11/2002 |
| WO | 2006/133026 A2 | 12/2006 |
| WO | 2011/086408 A1 | 7/2011 |
| WO | 2012/006019 A2 | 1/2012 |
| WO | 2016/130866 A1 | 8/2016 |

* cited by examiner

SMART PACKAGE

CROSS-REFERENCE TO RELATED APPLICATION

The application claims the benefit of priority under the provisions of 35 U.S.C. § 119 of U.S. Provisional Patent Application No. 62/115,569 filed Feb. 12, 2015 in the names of Joseph D. Sweeney, et al. for "SMART PACKAGE". The disclosure of U.S. Provisional Patent Application No. 62/115,569 is hereby incorporated by reference in its entirety, for all purposes.

FIELD

The present disclosure relates to a fluid supply packages for storage and dispensing of fluid, e.g., fluid having utility in the manufacture of semiconductor products, flat-panel displays, and solar panels, and to process tool assemblies comprising such packages, in which the fluid supply packages are informationally augmented, as "smart" packages.

DESCRIPTION OF THE RELATED ART

In the use of fluid supply packages, such as those in the aforementioned applications of manufacturing semiconductor products, flat-panel displays, and solar panels, it is desirable to manage the installation and operation of such packages at a high level of efficiency. Any excessive time requirement for installation of the fluid supply package in a fluid-utilizing facility to provide fluid to a recipient tool entails a severe economic penalty, as do fluid management issues associated with such packages, such as the failure to make needed adjustments of process tool settings when a fluid supply package is changed to introduce a new fluid, or the installation of a wrong type of fluid package for the desired process operation.

In consequence, the art continues to seek improvements in fluid supply packages and in the processes utilized therewith, to avoid such fluid supply package installation and operating issues.

SUMMARY

The present disclosure relates to fluid supply packages for storage and delivery of fluids, and process tool assemblies comprising such packages, in which the fluid supply packages are informationally augmented.

In one aspect, the disclosure relates to a fluid supply package, comprising a fluid storage and dispensing vessel, and a fluid dispensing assembly coupled to the vessel and configured to enable discharge of fluid from the vessel under dispensing conditions, wherein the fluid supply package comprises an informational augmentation device thereon, e.g., a quick read (QR) code and/or a radio-frequency identification (RFID) tag, for informational augmentation of the package.

In another aspect, the disclosure relates to a fluid supply kit, comprising a fluid supply package of the present disclosure, as variously described herein, and a machine reader configured to read the informational augmentation device.

In a further aspect, the disclosure relates to a process system comprising at least one fluid supply package of the present disclosure, as variously described herein, and a fluid-utilizing process tool configured to receive fluid from the at least one fluid supply package under the dispensing conditions.

A further aspect of the disclosure relates to a method of enhancing operation of a process tool receiving fluid from a fluid source for operation of the tool in a process system, said method comprising informationally augmenting the process system by supplying fluid from at least one fluid supply package as variously described herein.

Other aspects, features and embodiments of the disclosure will be more fully apparent from the ensuing description and appended claims.

DETAILED DESCRIPTION

Figure 1:
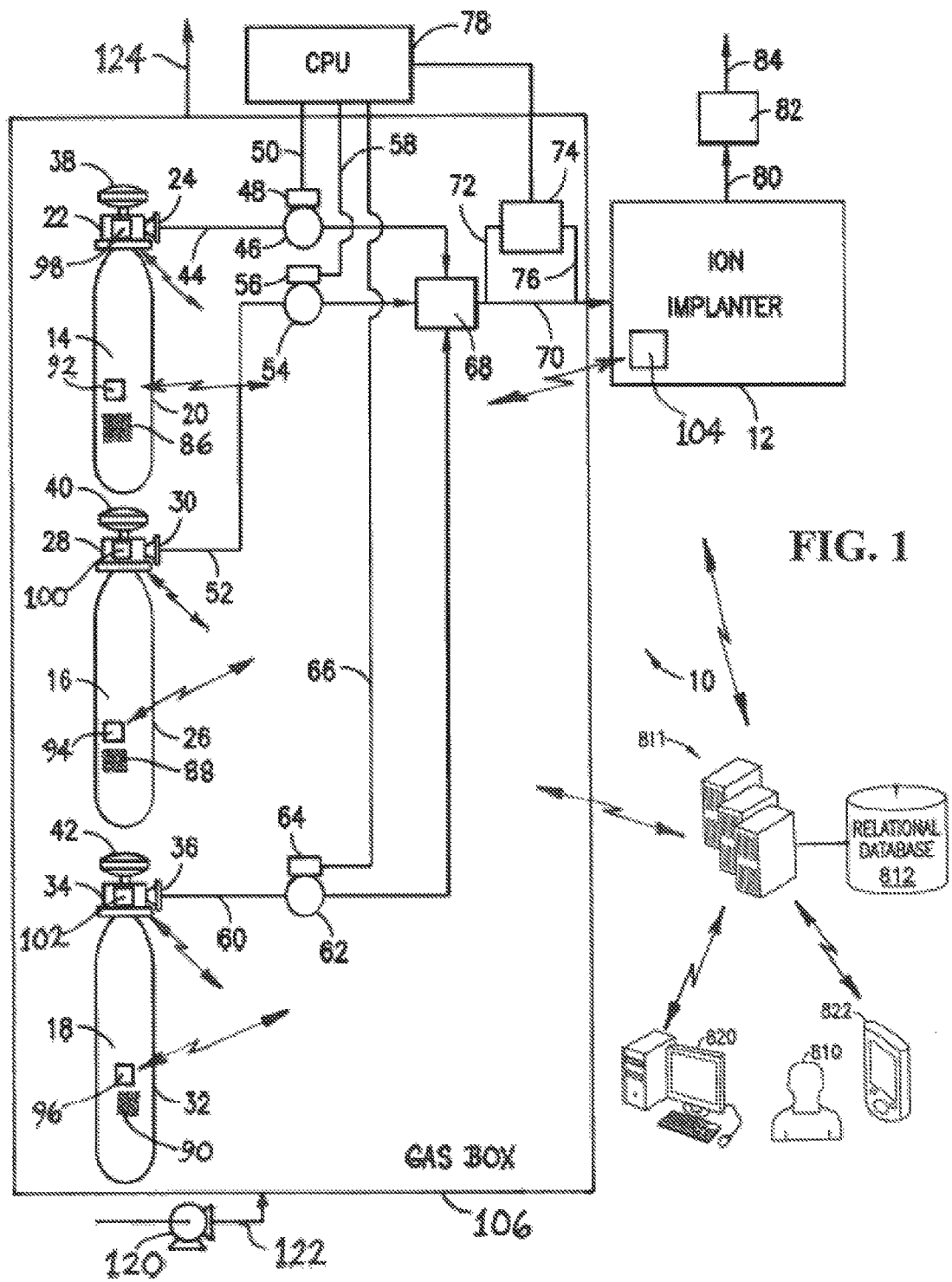
FIG. 1 is a schematic representation of an ion implantation system utilizing informationally augmented fluid supply packages and an informationally augmented ion implanter process tool, according to one embodiment of the present disclosure.

The present disclosure relates to informationally augmented fluid supply packages that may be utilized in process tool assemblies to achieve corresponding informationally augmented operation.

Such fluid supply packages comprise a fluid storage vessel in which fluid is stored for subsequent dispensing, and a fluid dispensing assembly coupled to the vessel and configured to enable discharge of fluid from the vessel under dispensing conditions.

In specific embodiments, the fluid supply package may comprise a storage medium in the interior volume of the vessel, as adapted to retain the fluid in a stored state under storage conditions, and to release the fluid for discharge from the vessel under dispensing conditions. The storage medium may be of any suitable type, and may for example comprise a solid-phase physical adsorbent, e.g., carbon adsorbent, zeolite, molecular sieve adsorbent, metal organic framework (MOF), aerogel, alumina, silica, aluminosilicate, porous metal oxide, or other porous solid adsorbent on which the fluid is reversibly adsorbable, with release of the fluid from the adsorbent being effected by application of heat, vacuum or other pressure differential, imposition of a concentration gradient by flow of a carrier fluid through the interior volume of the vessel to achieve concentration gradient-mediated desorption of the fluid and entrainment of the desorbed fluid in the carrier fluid, or a combination of two or more of such fluid release modalities, or other techniques for effecting disengagement of the fluid from the adsorbent on which it is stored.

Alternatively, the storage medium may comprise a liquid in which the fluid is reversibly dissolved or otherwise retained in the liquid storage medium, as for example an ionic liquid storage medium, in which the fluid is reversibly reacted with the ionic liquid for storage as a reaction product, with the reverse reaction being carried out under dispensing conditions to release the fluid for discharge from the vessel holding the ionic liquid.

Adsorbent-based fluid supply packages of the foregoing type, in which carbon adsorbent is employed as a fluid storage medium, are commercially available from Entegris Corporation (Billerica, Mass., USA) under the trademark SDS.

The fluid supply package in other embodiments may utilize vessels that contain one or more pressure regulators disposed in the interior volume of the vessel, in which the regulators are arranged with appropriate set point configurations, to effect dispensing of fluid at the set point of the regulator device, in response to pressure in dispensing flow circuitry connected to the fluid supply package, which is below the pressure set point of the single or final downstream regulator in the vessel of the fluid supply package.

Pressure-regulated fluid supply packages of such type are commercially available from Entegris Corporation (Billerica, Mass., USA) under the trademark VAC.

Other fluid supply packages that may be employed in the broad practice of the present disclosure include fluid supply packages in which a fluid supply vessel contains a capillary type flow restricting device positioned upstream of a regulator, vacuum actuated check valve, or other flow modulating device in the interior volume of the fluid supply vessel.

More generally, fluid supply packages of the present disclosure may be of any suitable configuration that is effective to contain the fluid during storage and transport conditions, and to discharge fluid from the fluid supply package under dispensing conditions. The dispensing conditions may be accommodated by actuating the fluid dispensing assembly to effect dispensing, e.g., by opening of a valve in a valve head of the fluid dispensing assembly of the package.

As used herein, and in the appended claims, the singular forms "a", "and", and "the" include plural referents unless the context clearly dictates otherwise.

As used herein, the term "fluid" is intended to be broadly construed to include gases, vapors, liquids, and combinations and mixtures of the foregoing, within the scope of such term.

The fluid supply packages, process systems, and process tool assemblies disclosed herein may comprise, consist, or consist essentially of any of the specific parts, components, and structures illustratively described herein. The disclosure further contemplates restrictively defined fluid supply packages, process systems, and process tool assemblies, e.g., wherein one or more of the specifically described parts, components, and structures may be specifically omitted, in defining operative embodiments of the present disclosure.

In one aspect, the present disclosure relates to a fluid supply package, comprising a fluid storage and dispensing vessel, and a fluid dispensing assembly coupled to the vessel and configured to enable discharge of fluid from the vessel under dispensing conditions, wherein the fluid supply package comprises an informational augmentation device thereon, e.g., at least one of a quick read (QR) code and a radio-frequency identification (RFID) tag, for informational augmentation of the package.

RFID tags useful for such purpose may be of any suitable type, and may for example be any one of: an active reader passive tag (ARPT); a passive reader active tag (PRAT); or an active reader active tag (ARAT).

Thus, by way of illustration, the fluid supply package in various embodiments may comprise a quick read (QR) code thereon, or an RFID tag thereon, or both a quick read (QR) code and an RFID tag thereon.

More generally, the fluid supply package may comprise any other informational augmentation device or devices. As used herein, the term "informational augmentation device" means a device, including hardware and/or software, that is effective to directly and/or indirectly provide information relevant to the fluid supply package and/or its use, wherein the information is accessible by or with the aid of a machine.

The informational augmentation device may for example include the aforementioned quick read (QR) codes, RFID tags, transponder devices, encoding devices, proximity cards, proximity badges, wireless communication devices, and combinations of any two or more of such devices. The informational augmentation device may comprise stored information in a component, subassembly, integrated circuit, or storage medium of the device, and such information may be coded or encrypted for security or other purposes.

The vessel in the fluid supply package may contain a storage medium that is adapted to retain fluid in a stored state under storage conditions, and to release the fluid for discharge from the vessel under dispensing conditions, e.g., a physical adsorbent material, such as carbon adsorbent. The storage medium in other embodiments may comprise a liquid, such as an ionic liquid.

The vessel in the fluid supply package in other embodiments may contain at least one interiorly disposed pressure regulator therein, configured to dispense fluid from the vessel to the fluid dispensing assembly at pressure determined by a set point of the pressure regulator. The vessel thus may contain one interiorly disposed pressure regulator therein, or alternatively, the vessel may contain multiple serially-arranged pressure regulators.

The fluid supply package may be constructed and arranged, to hold any suitable fluid. The fluid supply package may for example hold a fluid useful in the manufacture of at least one of semiconductor products, flat-panel displays, solar panels, LEDs, LED displays, and components, subassemblies, and portions of such products.

The fluid supply package in various embodiments may be configured with an informational augmentation device, e.g., a quick read (QR) code, that is readable by a machine reader, e.g., a QR code reader, to initiate accession of a website, display of a webpage, transmission of an email, or other telecommunication action providing information related to the fluid supply package, a fluid packaged therein, or use of the fluid supply package or fluid.

In other embodiments, the fluid supply package may be configured with an RFID tag that contains information related to the fluid supply package, a fluid packaged therein, or use of the fluid supply package or fluid. The RFID tag may be of a read/write character, and may have information storage capability as well as information transmission capability.

For example, the RFID tag may be a thermally-resistive RFID device that is effective to provide an output indicative of temperature of fluid in the fluid supply package. In instances where fluid is desirably stored at subatmospheric pressure, a fluid temperature readout from the thermally-resistive RFID device can be utilized to determine whether fluid in the vessel of the package is at the desired subatmospheric pressure condition, or whether temperature condition (thermal exposure) of the vessel has caused pressure to rise above a subatmospheric pressure level.

Thus, where the fluid storage and dispensing vessel of the package contains a physical adsorbent that desirably has the fluid adsorbed thereon to achieve subatmospheric pressure within the vessel, temperature excursions from desired baseline conditions may result in heating of the adsorbent, and desorption of the fluid from the adsorbent, thereby causing the pressure in the vessel to increase above the desired subatmospheric or other target pressure level of fluid storage. This in turn can be disadvantageous, if the fluid supply package is installed and a valve in the fluid dispensing assembly is opened, with a sudden efflux of high-pressure gas rather than the subatmospheric pressure fluid dispensing that is desired.

As another example, the fluid supply package may be constituted with an overpack enclosing the fluid storage and dispensing vessel, or with an overpack enclosing the vessel as well as the associated fluid dispensing assembly, so that the overpack arrangement serves to provide a thermally insulated environment for the fluid in the vessel of the package. For such purpose, the overpack may comprise a coolant medium and/or thermal insulation within the overpack housing or containment structure. In such instance, the ability to obtain a temperature reading from the thermally-resistive RFID device can be utilized to determine whether the overpack should be removed from the vessel and dispensing assembly, or whether the package should be subjected to refrigeration or other temperature adjustment process to achieve the desired temperature of fluid in the vessel.

The fluid supply package as variously described above may further comprise an interlock structure configured to preclude fluid dispensing from the fluid storage and dispensing vessel unless unlocked by an unlocking signal requiring for its generation information from the informational augmentation device. For example, the interlock structure may be unlockable by an unlocking signal requiring for its generation information from an informational augmentation device such as a quick read (QR) code and/or an RFID tag, where the fluid supply package is configured to include such informational augmentation devices. In such manner, the generation of unlocking signals using information from the informational augmentation device may be employed as a requisite for the desired operation involving fluid from the fluid supply package.

The disclosure in another aspect relates to a fluid supply kit, comprising a fluid supply package of the present disclosure, as variously described herein, and a machine reader configured to read information from the informational augmentation device. The fluid supply kit may be configured with the machine reader comprising a smart phone, tablet, or smart watch configured to read the informational augmentation device of the fluid supply package, e.g., at least one of a quick read (QR) code and an RFID tag, where the fluid supply packages configured with such informational augmentation devices.

In another aspect, the disclosure relates to a process system comprising at least one fluid supply package of the present disclosure, as variously described herein, and a fluid-utilizing process tool configured to receive fluid from the at least one fluid supply package under the dispensing conditions.

Such process system may be constituted, with the process tool including at least one communicational device that is communicationally interactive with the informational augmentation device of the fluid supply package, such as at least one of a quick read (QR) code and an RFID tag on the fluid supply package, for enabling operation of the process tool. For example, the process system may be constituted, such that the process tool is not operationally competent until communicational interaction of the process tool communicational device with the informational augmentation device on the fluid supply package satisfies a predetermined operational communication protocol.

The predetermined operational communication protocol may for example comprise verification of identity of the fluid supply package from fluid supply package information contained in the informational augmentation device, e.g., an RFID tag, on the fluid supply package. The fluid supply package information may comprise identity of fluid that is contained in the fluid supply package, process tool operating settings, process protocols for fluid in the fluid supply package, information relating to the installation of the fluid supply package of the process system for supplying fluid to the process tool, or any other suitable information.

The process tool in such process system may be of any suitable type, and may for example comprise an ion implantation process tool, a chemical vapor deposition process tool, an etching tool, or other suitable tool.

The process system may be constituted with a process tool that comprises a tool adapted for manufacture of at least one of semiconductor products, flat-panel displays, solar panels, LEDs, LED displays, and components, subassemblies, and portions of such products.

The process system in various embodiments may comprise multiple fluid supply packages. In some embodiments, the process system may comprise at least one fluid supply package in which the fluid supply package comprises a vessel containing physical adsorbent on which fluid is adsorbed at subatmospheric pressure, and in which the fluid supply package(s) are contained in a gas box that is ventilated with ventilation gas, with the process tool including at least one communicational device that is communicationally interactive with the informational augmentation device, e.g., at least one of a quick read (QR) code and an RFID tag on the fluid supply package, with the informational augmentation device on the fluid supply package comprising information indicative of subatmospheric pressure in the fluid supply package vessel, and with the at least one communicational device being configured to receive the subatmospheric pressure information and to output a control signal for controllably adjusting ventilation gas flow rate through the gas box in response to the subatmospheric pressure of the fluid in the fluid supply package.

A further aspect of the disclosure relates to a method of enhancing operation of a process tool receiving fluid from a fluid source for operation of the tool in a process system, in which the method comprises informationally augmenting the process system by supplying fluid from at least one fluid supply package as variously described herein.

In such method, the process tool may include at least one communicational device that is communicationally interactive with the informational augmentation device, e.g., at least one of a quick read (QR) code and an RFID tag, on the fluid supply package to enable operation of the process tool. The process system in which such methodology is carried out may be configured so that the process tool is not operationally competent until communicational interaction of the process tool communicational device with the informational augmentation device on the fluid supply package satisfies a predetermined operational communication protocol. The operational communication protocol in such methodology may include verification of identity of the fluid supply package from fluid supply package information contained in an RFID tag on the fluid supply package. The fluid supply package information may comprise information related to the identity of fluid that is contained in the fluid supply package, process tool operating settings, process protocols for fluid in the fluid supply package, information relating to installation of the fluid supply package in the process system for supplying fluid to the process tool, or any other appropriate information.

The process tool utilized in such methodology may likewise be of any suitable type, and may for example in various embodiments comprise an ion implantation process tool, a chemical vapor deposition process tool, and etching tool, or any other suitable tool. The process tool in other embodiments may comprise a tool adapted for manufacture of at least one of semiconductor products, flat-panel displays, solar panels, LEDs, LED displays, and components, subassemblies, and portions of such products.

The foregoing method may be carried out, utilizing multiple fluid supply packages for providing a fluid or combinations of different fluids.

Consistent with the preceding discussion, the method may be carried out, in which at least one fluid supply package comprises a vessel containing physical adsorbent on which fluid is adsorbed at subatmospheric pressure, and at least one such fluid supply package is contained in a gas box that is ventilated with ventilation gas, with the process tool including at least one communicational device that is communicationally interactive with the informational augmentation device, e.g., at least one of a quick read (QR) code and an RFID tag, on the fluid supply package, with the informational augmentation device on the fluid supply package comprising information indicative of subatmospheric pressure in the fluid supply package vessel, and with the at least one communicational device being configured to receive the subatmospheric pressure information and to output a control signal for controllably adjusting ventilation gas flow rate through the gas box in response to the subatmospheric pressure of the fluid in the fluid supply package. In this manner, the ventilation rate through the gas box may be substantially reduced to take advantage of the subatmospheric pressure fluid in the fluid supply packages, and the enhanced safety of using such fluid supply packages of subatmospheric pressure fluid, as compared to the use of conventional high-pressure gas cylinders.

Referring now to the drawings, FIG. 1 is a schematic representation of an ion implantation system 10 utilizing informationally augmented fluid supply packages and an informationally augmented ion implanter 12, according to one embodiment of the present disclosure.

The ion implantation process system including such fluid supply packages and ion implantation process tool is adapted for doping of substrates, with the ion implanter 12 being arranged in receiving relationship to gas supply packages 14, 16 and 18, for delivery of gas to the implanter.

The gas supply packages include a dopant gas supply package 14 including a vessel 20 containing a dopant source gas. The gas supply package 14 includes a valve head assembly 22 with a discharge port 24 joined to dopant source gas feed line 44. The valve head assembly 22 is equipped with a hand wheel 38, for manual adjustment of the valve in the valve head assembly, to translate same between fully open and fully closed positions for respective dispensing and storage of the dopant gas.

The dopant gas supply package 14 also includes disposed on the vessel 20 a quick read (QR) code 86 and an RFID tag 92. In other embodiments, the vessel may include one of such informational augmentation devices, viz., one of the QR code and RFID tag. In still other embodiments, the vessel may include other informational augmentation device or devices, as adapted to directly or indirectly provide information relevant to the fluid supply package and/or its use, for access by an operator or other individual, or for access and utilization by a cooperative information utilization device, processor, or assembly, to facilitate usage of the fluid supply package. The valve head assembly 22 includes a valve head interlock 98.

Gases are also contained in gas supply packages 16 and 18, each of which may be constructed similarly to gas supply package 14. Gas supply package 16 comprises a vessel 26 equipped with a valve head assembly 28 to which is coupled a hand wheel 40. The valve head assembly 28 includes a discharge port 30 to which is joined a co-flow gas feed line 52. The gas supply package 16 also includes disposed on vessel 26 a quick read (QR) code 88 and an RFID tag 94. As mentioned above, either of such informational augmentation devices may be separately used in other embodiments, or, alternatively, additional or other informational augmentation device(s) or device combinations may be employed. The valve head assembly 28 also includes a valve head interlock 100.

Gas supply package 18 includes vessel 32 equipped with a valve head assembly 34 to which is coupled hand wheel 42 for translation of the valve in the valve head assembly 34. The valve head assembly 34 includes discharge port 36 joined to gas discharge line 60. The valve head assembly 34 includes a valve head interlock 102. A quick read (QR) code 90 and an RFID tag 96 are provided on the exterior surface of the vessel 32. In other embodiments, either of such QR code and RFID tag may be utilized alone. In still other implementations, other informational augmentation device(s) or device combinations may be employed.

In the arrangement shown, one or more dopant source gases may be supplied, or dopant source gas(es) and non-dopant gas(es), may be supplied, in any desired combinations. For example, the illustrated arrangement permits three dopant source gases, or alternatively one dopant source gas and two co-flow gases, or alternatively two dopant source gases and one co-flow gas, to be selectively dispensed for co-flow to the mixing chamber 68. When a single dopant source gas is supplied by the gas supply package 14, the gas(es) supplied by fluid supply packages 16 and 18 may include diluents, co-species gases, cleaning gases, stabilizing gases, or any other suitable gas(es) that are advantageous in combination with the dopant source gas to carry out the desired ion implantation operation. Such additional gases may be co-flow gases that are flowed contemporaneously with the dopant source gas to the fluid-utilizing tool, or may be gases that are utilized separately, e.g., cleaning gases that are periodically used to clean the downstream flow circuitry and fluid-utilizing tool.

For the purpose of controlling flow from the respective sources, the respective gas feed lines 44, 52 and 60 are provided with flow control valves 46, 54 and 62 therein, respectively.

Flow control valve 46 may be equipped with an automatic valve actuator 48, having signal transmission line 50 connecting the actuator to CPU 78, whereby CPU 78 can transmit control signals in signal transmission line 50 to the valve actuator, to modulate the position of the valve 46 and correspondingly control the flow of gas from vessel 20 to the mixing chamber 68.

In like manner, gas discharge line 52 contains flow control valve 54 coupled with valve actuator 56 that in turn is coupled by signal transmission line 58 to the CPU 78. Correspondingly, flow control valve 62 in gas discharge line 60 is equipped with valve actuator 64 coupled by signal transmission line 66 to the CPU 78.

By this arrangement, the CPU can operatively control the flow of the respective gases from the corresponding vessels 20, 26 and 32.

As an alternative to such flow control arrangement, the system may employ mass flow controllers in the respective lines of the flow circuitry associated with the various gas supply packages, with the mass flow controllers being arranged to receive inputs from a graphic user interface (GUI) of a central computer or processor, or with the mass flow controllers being set or adjusted based on process recipes.

In the event that gases are concurrently flowed (co-flowed) to mixing chamber 68, the resulting gas mixture is discharged to feed line 70 for passage to the ion implanter 12.

Correspondingly, if only a single gas supply package 14, 16 or 18 is operated in dispensing mode, the corresponding single gas then flows through the mixing chamber, as modulated by the associated flow control valve, and is passed in feed line 70 to the ion implanter.

Feed line 70 is shown in the FIG. 1 embodiment as being coupled with a bypass flow loop comprised of bypass lines 72 and 76 communicating with the feed line, and with gas analyzer 74 disposed in the bypass flow loop. The gas analyzer 74 in this arrangement receives a side stream from the main flow in feed line 70, and responsively generates a monitoring signal correlative of the concentration, flow rate, etc. of the gas stream and transmits a monitoring signal in the signal transmission line coupling the analyzer 74 with CPU 78. In such manner, the CPU 78 receives the monitoring signal from gas analyzer 74, processes same and responsively generates output control signals that are sent to the respective valve actuators 48, 56 and 64, or a selected one or ones thereof, as appropriate, to effect the desired dispensing operation of gas to the ion implanter.

The bypass flow loop and gas analyzer shown in FIG. 1 are optional components. It will be recognized that in alternative arrangements in which mass flow controllers (MFCs) are employed to control feed rates from any particular gas supply package, the mix ratios can be determined and modulated without a gas analyzer.

The ion implanter 12 produces an effluent that is flowed in effluent line 80 to effluent treatment unit 82, which may treat the effluent by suitable effluent treatment operations such as scrubbing, catalytic oxidation, etc., to generate a treated gas effluent that is discharged from the treatment unit 82 in vent line 84, and may be discharged or alternatively passed to further treatment or other disposition.

Alternatively, the process system may be configured in other embodiments with an optional bypass loop with lines 110 and 114 with gas analyzer 112 disposed therebetween receiving a side stream of the exhaust flow in effluent line 80 and responsively generating a monitoring signal in the signal transmission line 114 coupling the gas analyzer 112 with CPU 78 such that the CPU 78 can receive and monitor gas constitution and generate output control signals to respective valve actuators 48, 56, and 64, to thereby optimize the process and gas usage efficiency.

The CPU 78 may be of any suitable type, and may variously comprise a general purpose programmable computer, a special purpose programmable computer, a programmable logic controller, microprocessor, or other computational unit that is effective for signal processing of the monitoring signal and generation of an output control signal or signals, as above described.

The CPU thus may be programmatically configured to effect a cyclic operation, e.g., concurrent flow of gases from two or all three of the sources 14, 16 and 18, or flow of the respective gases in sequence. Thus, any flow mode involving co-flow of gases, or sequential gas flows, may be accommodated.

It will therefore be recognized that doping of a substrate in the ion implanter may be carried out in any of various manners, to utilize dopant gas singly or in combination with other gas species. It will be appreciated that the dopant gas may be variously combined with hydride gas, fluoride gas, noble gas, oxide gas, or other gas, in various implementations of the ion implantation system shown in FIG. 1, or in ion implantation systems correspondingly configured for operation in accordance with the disclosure.

The substrate (not shown in FIG. 1) that is disposed in the ion implanter 12 may be of any suitable type. In various specific embodiments, the substrate can comprise a microelectronic substrate, an optoelectronic substrate, an optical substrate, a superconducting substrate, a semiconducting substrate, a photovoltaic substrate, or other type of substrate. In other specific embodiments, the substrate can comprise a substrate selected from among semiconductor substrates, solar panel substrates, LED substrates, and flat panel substrates.

As discussed above, each of the fluid supply packages 14, 16, and 18 shown in FIG. 1 includes a vessel that may have a quick read (QR) code and/or an RFID tag on an outer surface of the vessel, or other informational augmentation device associated with the vessel. The RFID tags may be of any suitable type, and may for example comprise read-write RFID tags including memory elements containing information concerning the package and/or the fluid therein. The ion implanter 12 includes an associated RFID tag machine reader that is configured to communicate with the RFID tags 92, 94, and 96 of the respective fluid supply package vessels 20, 26, and 32. The RFID tag machine reader 104 may additionally be configured to include a processor and a radio frequency transmitter by which information concerning the ion implanter and its operation may be transmitted from the reader 104 to the RFID tags on the respective vessels, and/or to monitoring and/or control devices associated with such vessels. Additionally, or alternatively, the machine reader 104 may be arranged to transmit information to the CPU 78, or alternatively to receive information from the CPU 78, for modulation of the operation of the fluid supply packages and/or the ion implanter process tool in the ion implantation system.

In the FIG. 1 system, the fluid supply packages 14, 16, and 18, and their associated valving and flow circuitry are contained in gas box 106. The gas box is ventilated by a ventilation gas flow therethrough. Ventilation gas is introduced by ventilation blower 120 to ventilation gas feed line 122 for flow through the interior volume of the gas box enclosure and discharge from the gas box in ventilation gas discharge line 124.

The process system shown in FIG. 1 may further comprise a server assembly 811 comprising multiple server units operatively linked to a relational database 812 that can for example contain a library of ion implantation process recipes, ion implantation process conditions, reference standards for the ion implantation operation, protocols for conducting ion implantation in the process system, historical records of ion implantation runs, and other data, accessible to the server units of the server assembly 811 for computational and communicational operations. The server assembly 811 may be located locally or remotely in relation to the ion implantation process system comprising a gas box 106 and ion implanter 12. The servers of the server assembly may be arranged in signal communication relationship with the computer 820 and smart phone 822 of an operator or technician 810 for the ion implantation system. Alternatively, the data and recipes may be stored locally on a computer that is part of the ion implanter.

The communicational components of the overall process system shown in FIG. 1 may be arranged for bidirectional communication with other communicational components in the system, to facilitate operations of the ion implantation system in a simple, efficient and reliable manner.

By the process system arrangement shown, the quick read (QR) code on the respective fluid supply vessels may be scanned by the smart phone 822 of the operator or technician, when the smart phone is loaded with a QR code reader application. In such manner, the QR code may be employed to launch a website on the smart phone 822, or on other communicational components of the system, such as computer 820, CPU 78, or server assembly 811, or the QR code may be employed to send emails, or to initiate other action. Thus, the QR code may act as a trigger for the supply of information to an operator or technician. Such information may include a Material Safety Data Sheet for the fluid contained in the specific vessel, or installation instructions for the vessel enabling it to be deployed in a quick and efficient manner in the gas box 106, or instructions for setting the parameters of the ion implanter 12 for processing the fluid supplied from the vessel bearing such QR code, or for otherwise interacting with the communicational components of the process system, and effecting operation of the ion implantation system and utilization of the fluid supply vessels therein. The QR code may also link to an application (app) on a smart phone or other processor or computer.

As a specific example, the QR code may launch a product specific website for the fluid supplied by the vessel bearing the QR code. As another example, the operator or technician may not know a specific torque to apply to a connection of the fluid supply package to the associated flow circuitry, and may scan the QR code with a smart phone, tablet, smart watch, or other communicational device, and be directed to a website with a user guide containing such information. As a further example, the operator or technician may be utilizing a specific gas mixture from the respective package vessels for the first time and may not know the correction factor to be applied to mass flow controllers in the flow circuitry. In such instance, scanning the QR code may launch a webpage containing such information on the smart phone, computer, or other device of the operator or technician. In another mode of operation, scanning the QR code may trigger transmission of an email from smart phone 822 or computer 820, to an account manager for the fluid supplier to request product information. It will be appreciated that the QR code can be utilized for accessing information relevant to the fluid supply package, the fluid contained therein, the associated fluid dispensing operation, a process operation utilizing the fluid, and/or settings, calibrations, correlations, etc. for the process equipment in the associated process system. The resulting information transmitted to the operator or technician may be of any suitable type, and may include data sheets, application notes, user guides, recommended process recipes, etc.

Thus, the fluid supply packages 14, 16, and 18 in the FIG. 1 system may include RFID tags on the respective vessels, and as indicated, such tags may be of a read/write character. Such tags may interact with the tag machine reader 104 on the ion implanter 12, so that the tag machine reader recognizes which fluid supply packages are installed in each gas stick of the gas supply flow circuitry, and correspondingly optimizes the performance of the ion implantation system.

For example, the tag machine reader 104 may read the tags 92, 94, and 96 of the respective fluid supply packages and thereby confirm that all such vessels are of a type containing solid-phase physical adsorbent in the respective vessels holding fluid at subatmospheric pressure. In connection with such confirmation of the presence of subatmospheric pressure fluid supply packages, the machine reader 104 may responsively transmit an output control signal to reduce the volumetric flow rate of ventilation gas flowed through the gas box 106, e.g., by a control signal that turns down the blower 120 feeding ventilation gas to the gas box, and/or that partially closes flow control valves (not shown) in the ventilation gas feed line 122 and ventilation gas discharge line 124, respectively, thereby taking advantage of the energy savings that result from use of such low pressure fluid supply packages, which do not require the high throughput ventilation gas flow rates that are needed to ensure safety when high-pressure gas cylinders containing fluid at pressure of 1000-2000 psi (6.9 MPa-13.8 MPa) are employed.

As another example, the tag machine reader 104 may read the tags 92, 94, 96 of the respective fluid supply packages and correspondingly set alarm limits of toxic gas monitor(s) (not shown) mounted in the gas box 106, based on the type of gas being supplied from the fluid supply packages in the gas box.

As a still further example, the information contained in the RFID tag on the vessel may be monitored by the tag machine reader 104 and include the amount of fluid in the cylinder, and such fluid inventory reading can then be used to generate a correlative signal to a monitoring and control system, to track fluid usage based on flow rate and to predict the endpoint of active dispensing operation for the specific fluid supply packages. This would assist operators or technicians to ensure that fluid supply packages are taken off-stream at the appropriate time and that the total inventory of fluid in the fluid supply packages is utilized.

Tagging of the vessels of the fluid supply packages in accordance with the present disclosure has the further benefit that tracking of fluid supply packages is facilitated, a significant advantage since thousands of industrial gas packages are in inventory and transit locations of fluid-utilizing facilities at any given time. The RFID tagging and QR coding thus can be employed to track specific types of fluid in an overall inventory of packages of many different fluids. Further, such tagging and coding can assist in remotely monitoring pressures of gas in specific fluid supply packages, and to confirm the identity of fluid in specific packages.

In specific embodiments, the tagging may comprise low-cost sensor patches that can be affixed to the vessel of the fluid supply package. The patch may contain RFID chips that utilize ISO14443a, b, or c communication protocols, or other protocols as necessary or desirable in a given application. The 14443 standard incorporates power transmission to the chip in order to operate it and the peripheral sensor chips. The incoming AC signal, which contains both data and power, is rectified and charge is stored in either on-chip or in-package capacitor(s). Operation using remote power is preferred in order to avoid battery requirements, and to achieve a highly cost-effective system. The RFID tag may contain non-volatile memory to store data on the storage history of the package, the transportation history of the package, etc. Sensor patches can be employed for sensing pressure of the fluid in the vessel, and such pressure can be employed with acoustic measurements at the surface of the vessel, e.g., by utilizing a H2M monitor (Entegris Corporation, Billerica, Mass., USA) for acoustic measurements in a wave guide cell, to verify the identity of the fluid in the package.

The fluid supply packages 14, 16, and 18 of the FIG. 1 system have respective valve heads 22, 28, and 34 featuring respective valve head interlocks 98, 100, and 102, which are arranged in communication relationship with the machine reader 104 associated with the ion implanter 12. By this configuration, the machine reader 104 can read information from the RFID tags 92, 94, 96 of the respective fluid supply packages, and verify that such fluid supply packages are appropriately coupled to flow circuitry for flow of the corresponding fluids to the ion implanter for the specified operation. The machine reader then responsively transmits a signal to the valve head interlocks 98, 100, and 102 on the respective fluid supply vessels, to unlock such interlocks and thereby open the valve head in each instance to the flow of fluid from the vessel through the valve head to the associated flow circuitry. Thus, the interlocks are maintained in a locked condition until signaled by the machine reader associated with the ion implanter 12.

This arrangement provides a highly effective "fail-safe" arrangement for ensuring that the specific fluid supply packages and specific process tool are interconnected with one another, and that the process tool cannot be operated without the specific fluids that are appropriate for performance of the desired process operation, e.g., in the manufacture of semiconductor product articles, solar panels or solar cells, LEDs, LED displays, flat panel displays, or components, subassemblies or portions of such products.

This arrangement also provides a highly effective enhanced safety arrangement for transport and storage of the specific fluid supply packages, by ensuring that the fluid supply packages are located in an approved gas box, coupled to an appropriate process tool, or back at a supply manufacturing facility for refill before valve head interlocks 98, 100, and 102 on the respective fluid supply vessels are unlocked and valves are opened to allow fluid flow.

Accordingly, the informational augmentation of the fluid supply packages and process tools in accordance with the present disclosure achieves enhanced efficiency in the installation and supply of fluids from fluid supply packages and in the operation of the associated fluid-utilizing process tools. The informational augmentation components can be configured in a wide variety of configurations, to effect computational and communicative operations, e.g., by bidirectional transmission and receipt of data and signal communications, and such communications may be effected utilizing a worldwide communications network such as the Internet, or other network.

The servers in the server assembly 811 of the FIG. 1 system may be arranged to process the communicated information generated in the system, in any suitable manner. For example, the servers may effect an algorithmic comparison of fluid information with reference standards and provide comparison data to the CPU 78, computer 820, smart phone 822, or other communication devices or components in the system.

Figure 2:
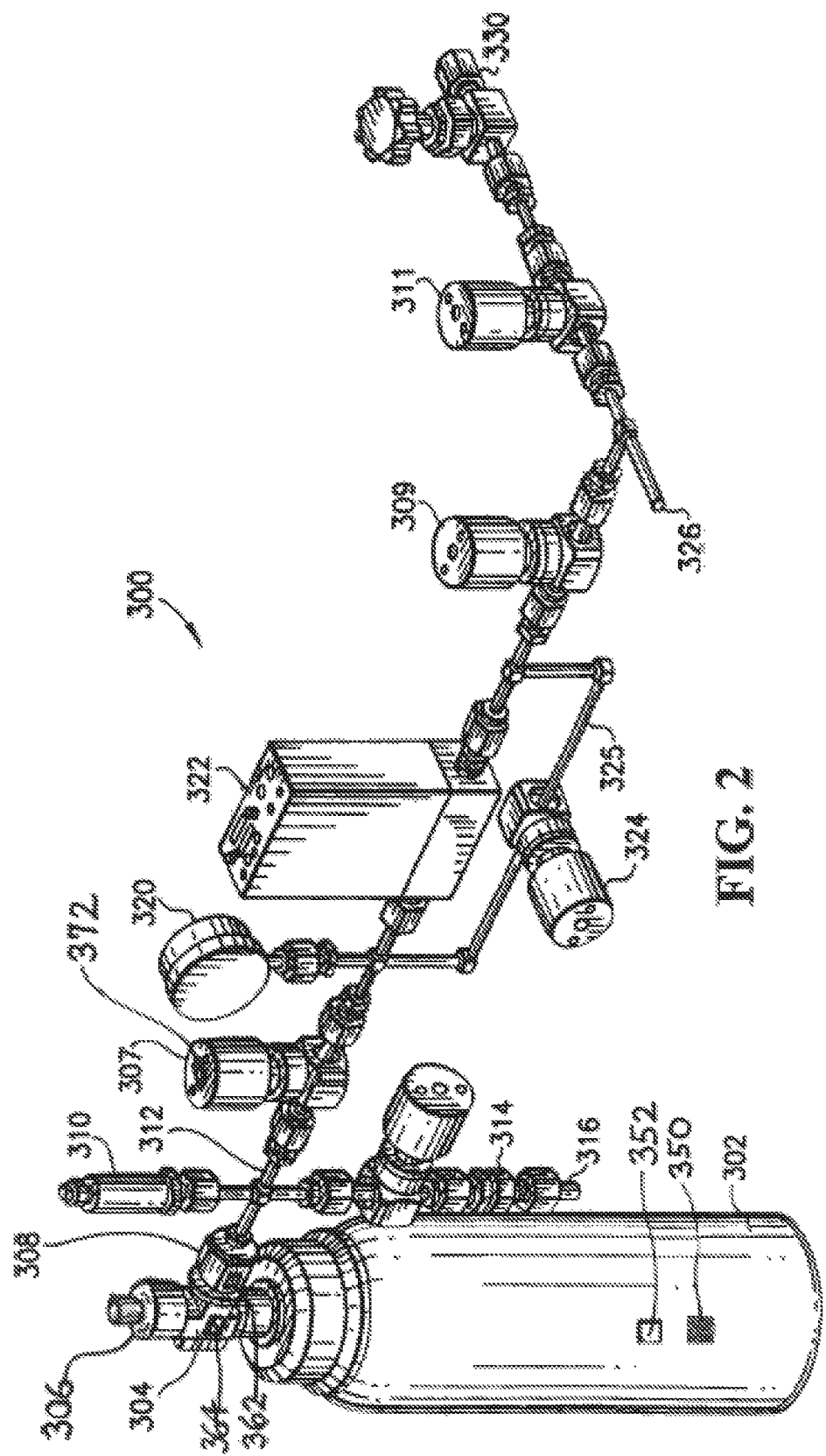
FIG. 2 is a process system including an informationally augmented fluid supply package configured for delivery of gas, in accordance with another embodiment of the present disclosure.

FIG. 2 is a schematic representation of a process system 300 including an informationally augmented fluid supply package configured for delivery of gas, in accordance with another embodiment of the present disclosure.

As illustrated in FIG. 2, the fluid supply package includes a fluid storage and dispensing vessel 302 having joined to its upper end a valve head 304 coupled with a pneumatic valve actuator 306. The valve head is coupled to a VCR fitting 308, which in turn is coupled with flow conduit 312. Flow conduit 312 communicates with the pressure transducer 310, as well as the check valve 314 and nitrogen purge inlet 316. The nitrogen purge inlet is employed for introduction of nitrogen or other purge gas for clearance of the dispensing assembly flow passages and passages of the associated flow circuitry, for subsequent dispensing of gas from vessel 302.

Flow conduit 312 has disposed therein a flow control valve 307, a span gauge 320, a mass flow controller 322, and a flow control valve 309. The flow conduit 312 also is coupled in flow circuit-forming relationship to the bypass conduit 325 having by-pass valve 324 therein. The flow conduit 312 is joined at its right hand end as shown, to a gas box manifold conduit 326. Conduit 326 has valve 311 positioned therein, and has a coupling 330 opposite the end communicating with the gas box manifold, for coupling of the fluid storage and dispensing package with a downstream fluid-utilizing process tool, such as an ion implantation tool, a chemical vapor deposition tool, and etching tool, or other tool. It will be recognized that this flow circuitry can be variously configured, and in other embodiments the valves 307 and 309 may be constituted as simple shut-off valves or flow access valves, and/or the component 322 may, instead of being a mass flow controller, be a mass flow meter that is configured to sense flow and to responsively transmit a signal for modulation of a flow control valve in the flow circuitry.

In operation, gas from the fluid storage and dispensing vessel 302 is flowed in flow conduit 312 and gas box manifold conduit 326 to the downstream fluid-utilizing process tool, at a controllable rate, as controlled by mass flow controller 322. The pressure transducer 310 may be operatively coupled to mass flow controller 322, as well as to other elements, e.g., valves, in the flow circuit, to carry out the dispensing of the gas for flow to the fluid-utilizing process, in a suitable manner.

As shown in FIG. 2, the fluid storage and dispensing vessel 302 has disposed on its external surface a QR code 350 and an RFID tag 352. The VCR fitting 308 is provided with a valve coupling interlock mechanism 362 therein, which prevents coupling of the flow conduit 312 to the valve head 304 of the fluid supply package unless the machine reader on a downstream process tool reads the information contained in the RFID tag 352 and verifies that the fluid supply package is appropriate for operation therewith, whereupon the machine reader (not shown in FIG. 2) transmits a signal to the valve coupling interlock mechanism 362 to unlock the fitting so that it can be connected to the valve head 304 of the fluid supply package.

A further interlock mechanism is provided on the valve head 304, in the form of the valve head dispensing interlock mechanism 364, which likewise requires an actuating signal to be transmitted from the machine reader on the process tool to enable the valve in the valve head to be unlocked for dispensing operation. This provides a further fail-safe aspect of the fluid supply package usage.

Alternatively, or additionally, an interlock mechanism 372 may be provided on the flow control valve 307, whereby such flow control valve is unlocked by an actuating signal transmitted from the machine reader on the process tool.

It will therefore be appreciated that the process system may be provided with any appropriate number and types of interlock mechanisms, to cooperatively integrate the fluid supply package operation with the process tool operation, and to ensure that the appropriate fluids and fluid supply packages are being employed for process tool operation.

While the disclosure has been set forth herein in reference to specific aspects, features and illustrative embodiments, it will be appreciated that the utility of the disclosure is not thus limited, but rather extends to and encompasses numerous other variations, modifications and alternative embodiments, as will suggest themselves to those of ordinary skill in the field of the present disclosure, based on the description herein. Correspondingly, the disclosure as hereinafter claimed is intended to be broadly construed and interpreted, as including all such variations, modifications and alternative embodiments, within its spirit and scope.

What is claimed is:

1. A fluid supply package, comprising a fluid storage and dispensing vessel, and a fluid dispensing assembly coupled to the vessel and configured to enable discharge of fluid from the vessel under dispensing conditions, wherein the fluid supply package comprises an informational augmentation device thereon, the fluid supply package further comprising a storage medium wherein the storage medium comprises a physical adsorbent material which comprises an adsorbent selected from the group consisting of carbon adsorbent, zeolite, molecular sieve adsorbent, metal organic framework (MOF), aerogel, alumina, silica, aluminosilicate, porous metal oxide, and combinations of two or more of the foregoing.

2. The fluid supply package of claim 1, wherein the informational augmentation device comprises at least one of a quick read (QR) code and an RFID tag.

3. The fluid supply package of claim 1, wherein the informational augmentation device comprises an RFID tag.

4. The fluid supply package of claim 3, wherein the RFID tag comprises a tag selected from the group consisting of: an active reader passive tag (ARPT); a passive reader active tag (PRAT); and an active reader active tag (ARAT).

5. The fluid supply package of claim 3, wherein the RFID tag comprises a thermally-resistive RFID device that is effective to provide an output indicative of temperature of fluid in the fluid supply package.

6. The fluid supply package of claim 1, wherein the vessel contains a storage medium that is adapted to retain fluid in a stored state under storage conditions, and to release the fluid for discharge from the vessel under dispensing conditions.

7. The fluid supply package of claim 1, wherein the vessel contains at least one interiorly disposed pressure regulator therein configured to dispense fluid from the vessel to the fluid dispensing assembly at pressure determined by a set point of the pressure regulator.

8. The fluid supply package of claim 1, holding a fluid in the fluid storage and dispensing vessel.

9. The fluid supply package of claim 1, wherein the informational augmentation device is readable by a machine reader to initiate accession of a website, display of a webpage, transmission of an email, or other telecommunication action providing information related to the fluid supply package, a fluid packaged therein, or use of the fluid supply package or fluid.

10. The fluid supply package of claim 1, further comprising an interlock structure configured to preclude fluid dispensing from the fluid storage and dispensing vessel unless unlocked by an unlocking signal requiring for its generation information from the informational augmentation device.

11. The fluid supply package of claim 10, wherein the informational augmentation device comprises a quick read (QR) code, and the interlock structure is unlockable by an unlocking signal requiring information from the quick read (QR) code for its generation.

12. The fluid supply package of claim 1, wherein the informational augmentation device comprises an RFID tag, and the interlock structure is unlockable by an unlocking signal requiring information from the RFID tag for its generation.

13. A process system comprising at least one fluid supply package comprising a fluid storage and dispensing vessel, and a fluid dispensing assembly coupled to the vessel and configured to enable discharge of fluid from the vessel under dispensing conditions, wherein the fluid supply package comprises a storage medium including a physical adsorbent material which comprises an adsorbent selected from the group consisting of carbon adsorbent, zeolite, molecular sieve adsorbent, metal organic framework (MOF), aerogel, alumina, silica, aluminosilicate, porous metal oxide, and combinations of two or more of the foregoing, an informational augmentation device thereon, and a fluid-utilizing process tool configured to receive fluid from the at least one fluid supply package under the dispensing conditions.

14. The process system of claim 13, wherein the process tool includes at least one communicational device that is communicationally interactive with the informational augmentation device on the fluid supply package for enabling operation of the process tool.

15. The process system of claim 13, wherein the process tool is not operationally competent until communicational interaction of the process tool communicational device with the informational augmentation device on the fluid supply package satisfies a predetermined operational communication protocol.

16. The process system of claim 13, wherein the predetermined operational communication protocol comprises verification of identity of the fluid supply package from fluid supply package information contained in the informational augmentation device on the fluid supply package.

17. The process system of claim 13, wherein the process tool comprises at least one of an ion implantation process tool, a chemical vapor deposition process tool, and etching tool.

18. The process system of claim 13, wherein the at least one fluid supply package comprises a fluid which is adsorbed on the physical adsorbent at subatmospheric pressure, and the at least one fluid supply package is contained in a gas box that is ventilated with ventilation gas, wherein the process tool includes at least one communicational device that is communicationally interactive with the informational augmentation device on the fluid supply package, wherein the informational augmentation device on the fluid supply package comprises information indicative of subatmospheric pressure in the fluid supply package vessel, and wherein said at least one communicational device is configured to receive the subatmospheric pressure information and to output a control signal for controllably adjusting ventilation gas flow rate through the gas box in response to the subatmospheric pressure of the fluid in the fluid supply package.

19. A method of enhancing operation of a process tool receiving fluid from a fluid source for operation of the tool in a process system, said method comprising informationally augmenting the process system by supplying fluid from at least one fluid supply package, wherein the fluid supply package comprises a fluid storage and dispensing vessel including a physical adsorbent material which comprises an adsorbent selected from the group consisting of carbon adsorbent, zeolite, molecular sieve adsorbent, metal organic framework (MOF), aerogel, alumina, silica, aluminosilicate, porous metal oxide, and combinations of two or more of the foregoing, and a fluid dispensing assembly coupled to the vessel and configured to enable discharge of fluid from the vessel under dispensing conditions, and wherein the fluid supply package comprises an informational augmentation device thereon.

* * * * *